US012056299B2

(12) United States Patent
Amano

(10) Patent No.: US 12,056,299 B2
(45) Date of Patent: Aug. 6, 2024

(54) INPUT DISPLAY DEVICE

(71) Applicant: Alps Alpine Co., Ltd., Tokyo (JP)

(72) Inventor: Takashi Amano, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/485,603

(22) Filed: Oct. 12, 2023

(65) Prior Publication Data

US 2024/0126386 A1 Apr. 18, 2024

(30) Foreign Application Priority Data

Oct. 13, 2022 (JP) ................................ 2022-164522

(51) Int. Cl.
*G06F 3/039* (2013.01)
*G06F 3/0338* (2013.01)
*G06F 3/044* (2006.01)

(52) U.S. Cl.
CPC .......... *G06F 3/0393* (2019.05); *G06F 3/0338* (2013.01); *G06F 3/044* (2013.01)

(58) Field of Classification Search
CPC ....... G06F 3/0393; G06F 3/0338; G06F 3/044
See application file for complete search history.

(56) References Cited

U.S. PATENT DOCUMENTS

| 2014/0160064 | A1  | 6/2014  | Yairi et al. |
| 2015/0052433 | A1* | 2/2015  | Chen ............... G06F 3/0482 715/716 |
| 2019/0250740 | A1  | 8/2019  | Okuzumi et al. |
| 2019/0391671 | A1* | 12/2019 | Pfau ............... G06F 3/0362 |
| 2022/0037100 | A1  | 2/2022  | Sherriff |
| 2022/0253158 | A1  | 8/2022  | Gaillard et al. |

FOREIGN PATENT DOCUMENTS

JP 2020-190832 A 11/2020

OTHER PUBLICATIONS

Extended European Search Report from EP 23202015.6, Feb. 16, 2024, 5 pp.

* cited by examiner

*Primary Examiner* — Benjamin C Lee
*Assistant Examiner* — Nathan P Brittingham
(74) *Attorney, Agent, or Firm* — Crowell & Moring LLP

(57) ABSTRACT

An input display device includes a display configured to display an image, a capacitive touch panel configured to be attached onto the display and include at least one three-dimensional UI portion on a surface of the touch panel, and a detection unit configured to detect an operation on the touch panel. The three-dimensional UI portion includes a pulling portion imitating the shape of a pulling type switch, and the detection unit determines a pulling operation by detecting a change in a capacitance in response to a change in a distance from a finger touching the pulling portion to the touch panel.

8 Claims, 10 Drawing Sheets

INPUT DISPLAY DEVICE

RELATED APPLICATION

The present application claims priority to Japanese Patent Application No. 2022-164522, filed Oct. 13, 2022, pending, the entirety of which is herein incorporated by reference.

BACKGROUND

1. Field

The present disclosure relates to an input display device having a human-machine interface function, and more particularly, to an input display device including an operation portion having a three-dimensional shape.

2. Description of the Related Art

Disclosed in the prior art is an input display device in which a protrusion is provided on a touch panel disposed to be superposed on a display, and an image such as an operation icon is displayed at a position overlapping the protrusion (for example, JP 2020-190832 A). A user performs an input by performing a touch operation on the protrusion.

SUMMARY

In a display device that allows a capacitive touch operation to be performed, a user interface allows a touch position to be ascertained without looking, by allowing the touch position to be tactilely recognized due to a cover glass having an uneven shape (referred to below as a three-dimensional UI).

FIG. 1A illustrates an operation example of a conventional flat touch panel. A user U visually recognizes an operation icon 12 displayed on a display 10 and performs an input by performing a touch operation on a position of the operation icon 12.

FIG. 1B illustrates an operation example of a touch panel having a three-dimensional UI, and FIG. 1C is a schematic cross-sectional view of the three-dimensional UI. A transparent cover lens 26 having an uneven shape is attached onto a touch panel 24, and a display 20 displays an operation icon 22 at a position overlapping the cover lens 26. The user U performs an input by touching the cover lens 26 with a finger. A highly sensitive electrostatic sensor capable of detecting the capacitance (distance) of a finger, even if a distance from the sensor is long, is used for the touch detection. Thus, it is possible to determine whether or not there is a touch, even on the thick cover lens 26. This makes it possible to reduce touch mistakes (operation mistakes) under a situation in which it is difficult to look at an in-vehicle display during driving.

As described above, in the three-dimensional UI, in order to realize shapes imitating various physical switches (buttons, knobs, sliders, and the like) existing in a vehicle interior, and operation detection thereof by the touch panel, it is required to handle various operation gestures.

As one of the operation gestures, illustrated in FIG. 2A, in-vehicle switches include a switch 30 of a type that pulls (or lifts) an end portion of the switch upward, such as a power window switch. When a shape imitating such a pulling type switch 30 is realized by the touch panel, as illustrated in FIG. 2B, it is necessary to attach a cantilevered cover glass 60 (the same applies to resin or the like) that catches a finger to the surface of a touch panel 50 mounted on a display 40.

However, there is a distance between a sensor that detects the capacitance and a touch position of the finger, and the finger is lifted in a direction (arrow direction) opposite to the sensor. Thus, it is difficult to accurately detect a finger pulling operation by a configuration of the cover glass 60.

As a solution, as illustrated in FIG. 2C, it is conceivable to mount a touch sensor 64 that detects the capacitance on the back surface of a cantilevered operation portion 62 of the cover glass 60, but this is not realistic because the number of parts of the touch sensor 64 increases and the structure becomes complicated.

From the above description, there is a need for a structure and a method capable of more accurately detecting a pulling operation, while maintaining a configuration imitating the pulling type switch 30 illustrated in FIG. 2B.

The present disclosure has been made to solve such a conventional problem, and an object of the present disclosure is to provide an input display device capable of detecting a pulling operation on a three-dimensional operation portion.

According to the present disclosure, an input display device includes a display configured to display an image, a capacitive touch panel configured to be attached onto the display and include at least one three-dimensional operation portion on a surface of the touch panel, and a detection unit configured to detect an operation on the touch panel, wherein the three-dimensional operation portion includes a pulling portion imitating a shape of a pulling type switch, and the detection unit determines whether or not there is a pulling operation by detecting a change in a capacitance in response to a change in a distance to the touch panel from a finger touching the pulling portion.

In one aspect, the operation portion is attached to be separable from the touch panel via an elastic member. In one aspect, the elastic member is provided between a bottom surface of the operation portion and a fixing portion that supports the display. In one aspect, the operation portion includes the pulling portion and a bottom surface portion disposed below the pulling portion, and the elastic member is provided between the pulling portion and the bottom surface portion. In one aspect, the operation portion includes the pulling portion and a bottom surface portion disposed below the pulling portion, and the elastic member is provided between the pulling portion and a fixing portion that supports the display. In one aspect, the pulling portion is configured by a member that is elastically deformable in a pulling direction. In one aspect, the detection unit determines that a pulling operation has been performed when a decrease in capacitance of the pulling portion is equal to or greater than a threshold value. In one aspect, the detection unit determines that a pressing operation has been performed when an increase in capacitance of the pulling portion is equal to or greater than a threshold value. In one aspect, the detection unit determines whether or not there is a pulling operation by detecting a change in a capacitance due to a change in a shape of a finger touching the pulling portion. In one aspect, the input display device further includes a display unit configured to display an icon representing an input operation at a position corresponding to the operation portion of the display.

According to the present disclosure, since whether or not there is a pulling operation is determined by detecting a change in a capacitance in response to a change in a distance to the touch panel from a finger touching a pulling portion, it is possible to more accurately detect the pulling operation with a simple structure, without increasing the number of parts of a touch sensor.

BRIEF DESCRIPTION OF THE DRAWINGS

FIG. 4A illustrates a schematic cross-section of the three-dimensional UI portion, FIG. 4B illustrates a change in a finger distance when a cushion material is used, and FIGS. 4C and 4D are views illustrating a change in the finger distance when crushing or deformation of a finger is used;

DETAILED DESCRIPTION

Next, an embodiment of the disclosure will be described. An input display device according to the present disclosure provides an interface between a person and a machine. The input display device in the present disclosure is not particularly limited, but is applied to, for example, an electronic device equipped with a display with a touch panel. The electronic device equipped with the display with the touch panel is, for example, an in-vehicle device having a navigation function, an audio visual function, a television function, and the like.

Figure 3:
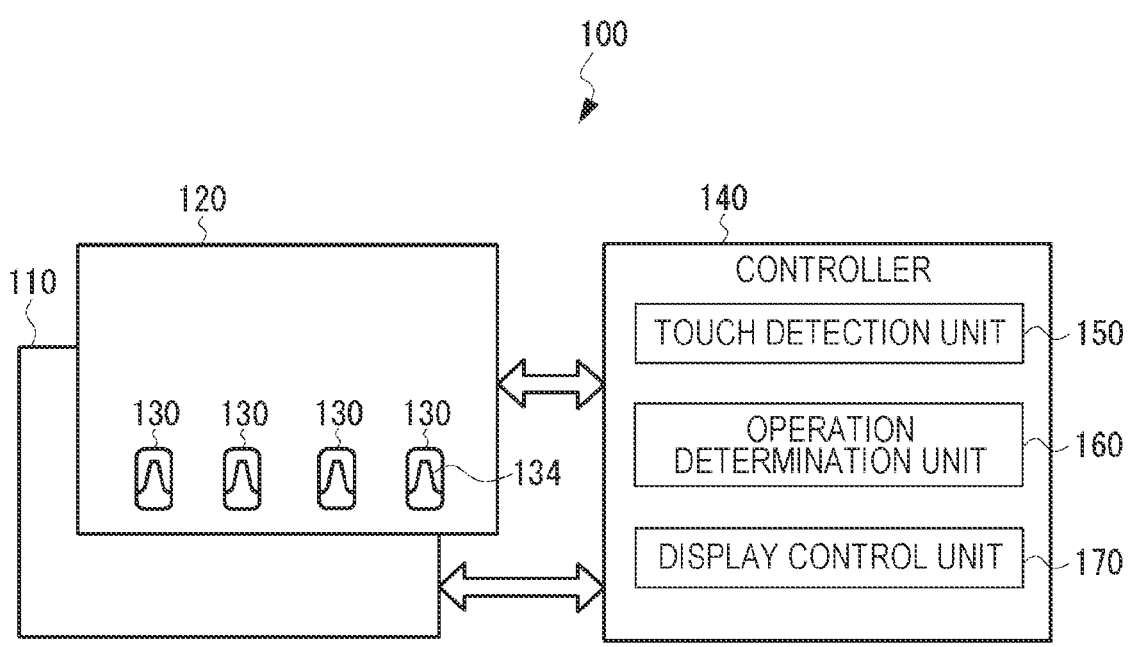
FIG. 3 is a block diagram illustrating a configuration of an input display device according to an example of the present disclosure.

Next, examples of the present disclosure will be described in detail with reference to the drawings. FIG. 3 is a block diagram illustrating a configuration of an input display device according to an example of the present disclosure. In the present example, an input display device 100 includes a display 110 that displays an image and/ot a video, a capacitive touch panel 120 mounted on the display 110, a three-dimensional UI portion (or an operation portion) 130 that has one or a plurality of three-dimensional shapes and is attached to the surface of the touch panel 120, and a controller 140 that controls image display of the display 110, touch detection of the touch panel 110, and the like.

The display 110 is not particularly limited, but includes, for example, a liquid crystal panel or an organic EL panel. The display 110 displays image data provided from the controller 140. For example, an icon representing an input operation of the three-dimensional UI portion 130 is displayed below the three-dimensional UI portion 130.

The touch panel 120 includes, for example, a plurality of detection units (sensors) formed at positions where a plurality of X-side and Y-side electrode lines intersect. The detection unit changes a capacitance when a finger, a hand, or the like of a user approaches or comes into contact with the touch panel 110. The touch panel 120 is mounted on the display 110 and provides an input interface for the user to make an input on an icon or the like displayed on the display 110.

Figure 1A:
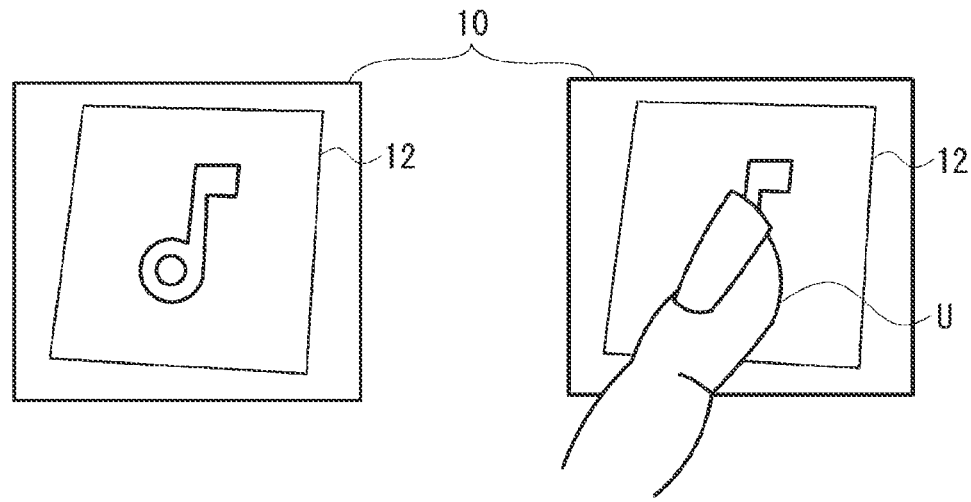
FIG. 1A illustrates an operation example of a flat touch panel.
Figure 1B:
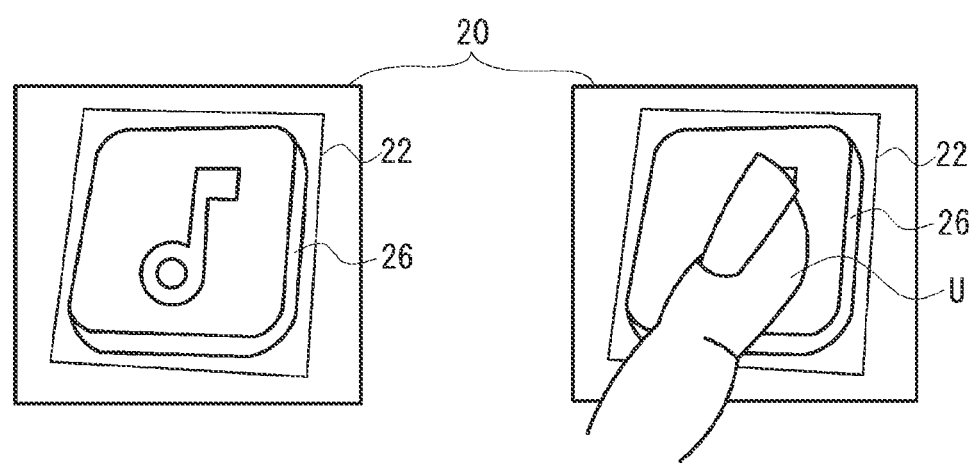
FIG. 1B illustrates an operation example of a touch panel of a three-dimensional UI.
Figure 1C:
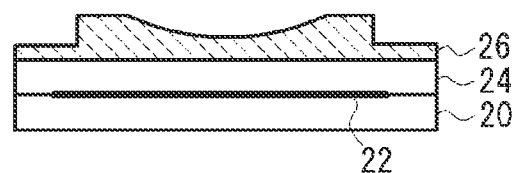
FIG. 1C is a schematic cross-sectional view of the three-dimensional UI.
Figure 2A:
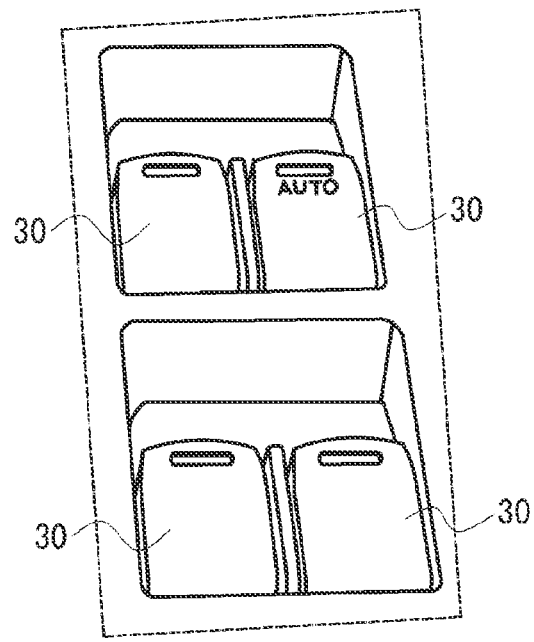
FIGS. 2A to 2C are views for describing a problem of a conventional three-dimensional UI portion.
Figure 2B:
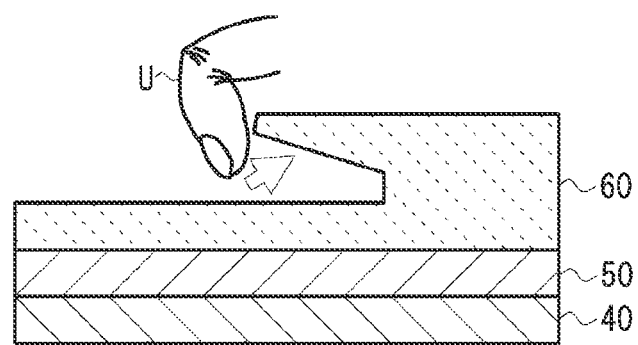
Figure 2C:
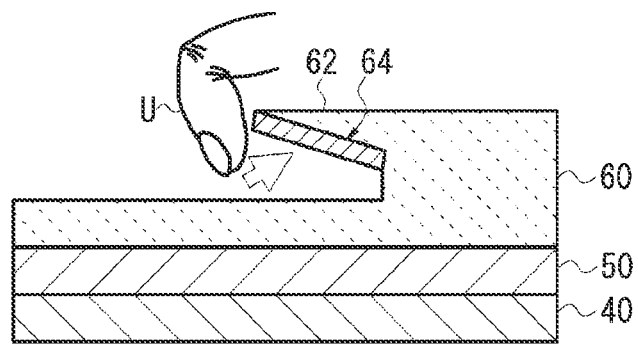

The touch panel 120 further includes one or a plurality of three-dimensional UI portions (operation portions) 130 on the surface of a transparent panel. The three-dimensional UI portion 130 has a shape that allows a user to perform a pulling operation with a finger, and includes, for example, a cantilevered pulling portion 134 that pulls (or lifts) an end portion upward, as illustrated in FIG. 2B. The pulling portion 134 imitates the shape of a power window switch as illustrated in FIG. 2A. The number, the size, and the like of the three-dimensional UI portions 130 are not particularly limited. The three-dimensional UI portion 130 is configured such that, when the hand or the finger of the user performs an operation of pulling or lifting the three-dimensional UI portion 130, the capacitance at that position changes.

FIG. 3 illustrates an example in which four three-dimensional UI portions 130 are attached below the touch panel 120. The three-dimensional UI portion 130 is configured by using, for example, a transparent material such as acrylic, polycarbonate, or glass. An icon representing an input operation of the user is displayed at a position of the display 110 corresponding to the three-dimensional UI portion 130. However, the entirety of the three-dimensional UI portion 130 does not need to be transparent, and a portion of the three-dimensional UI portion 130, which does not interfere with the icon, may be non-transparent. The user visually recognizes the icon displayed below the three-dimensional UI portion 130 and performs an input by performing a pulling operation on the three-dimensional UI portion 130.

Figure 4A:
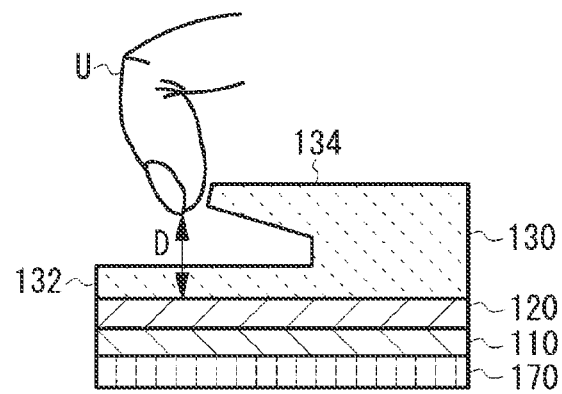
FIGS. 4A to 4D are views for describing an outline of the input display device according to the example of the present disclosure.

Next, an outline of the input display device 100 in the present example will be described with reference to FIGS. 4A to 4D. FIG. 4A illustrates a schematic cross-section of the three-dimensional UI portion 130. As illustrated in FIG. 4A, the display 110 is fixed on a product cover (or cover glass or the like) 170, and the touch panel 120 is mounted on the product cover 170. The three-dimensional UI portion 130 is attached to the surface of the touch panel 120.

The three-dimensional UI portion 130 includes, for example, a bottom surface portion 132 and a pulling portion 134 extending from the bottom surface portion 132 in a cantilever manner. The bottom surface portion 132 is bonded to a determined position of the touch panel 120 by using, for example, a double-sided adhesive or the like. The coordinates indicating the attachment position of the bottom surface portion 132 and the shape of the bottom surface portion 132 are registered in the controller 140 in advance. For example, when the bottom surface portion 132 has a circular shape, the coordinates of the center and the radius of the bottom surface portion 132 are registered. When the bottom surface portion 132 has a rectangular shape, the coordinates of the intersection point between the diagonal lines and the coordinates of the corner of the bottom surface portion 132 are registered. Furthermore, the height of the pulling portion 134 of the three-dimensional UI portion 130 is also registered.

In the present example, the three-dimensional UI portion 130 detects a change in a distance (referred to below as a finger distance) to the detection unit (sensor) of the touch panel 120 from a finger U when the finger U touches the pulling portion 134, and, in this manner, a pulling operation on the pulling portion 134 can be detected.

Figure 4B:
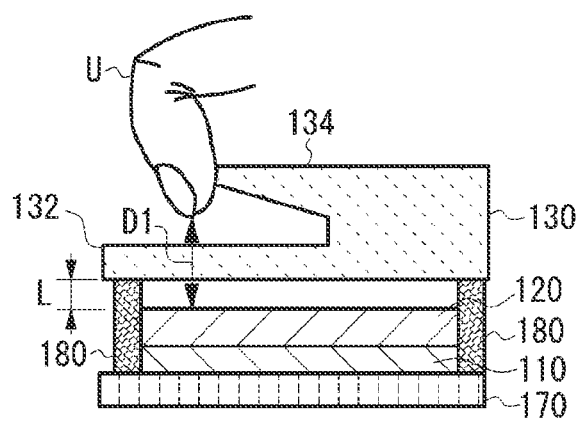
Figure 4C:
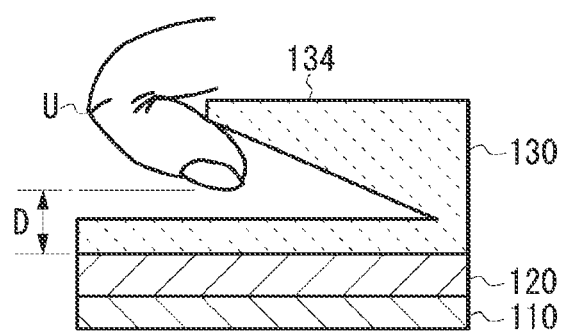
Figure 4D:
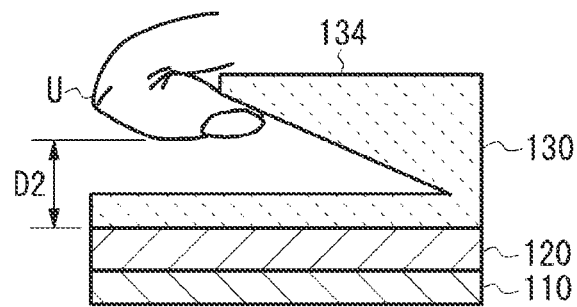

As illustrated in FIG. 4A, for example, as in an operation of the power window switch, the finger U is hooked on the end portion of the pulling portion 134, the change in the finger distance D at which the finger U moves away from the touch sensor when the pulling operation is made is detected, and whether or not there is the pulling operation is determined. When the finger distance D increases by the pulling action, the value of the capacitance detected by the touch sensor decreases. Therefore, in the present example, the detection of the pulling operation is realized by implementing i) a detection structure using a cushion material 180, illustrated in FIG. 4B, in which the change in the finger distance D is likely to occur when pulling is performed with the finger U, and ii) a pulling detection algorithm for detecting the deformation of the finger U at the time of the pulling operation, as illustrated in FIGS. 4C and 4D.

In the detection structure using the cushion material, the shape, material, size, attachment position, and the like, of the cushion material are not particularly limited, as long as the finger distance D increases when the user lifts the pulling portion 134. In the detection structure illustrated in FIG. 4B, two cushion materials 180 that are elastically deformable in the vertical direction are attached between both ends of the bottom surface portion 132 of the three-dimensional UI portion 130 and the product cover 170. The cushion material 180, for example, may be an elastic member such as rubber, spring, sponge, or resin. When the user performs an operation of pulling the pulling portion 134 with the finger U, the three-dimensional UI portion 130 is somewhat lifted upward by the cushion material 180, and a slight distance L is generated between the bottom surface portion 132 and the surface of the touch panel 120. This changes the finger distance from D to D1 (D<D1), which results in a change in a capacitance for determining whether or not there is a pulling operation.

In the above example, the three-dimensional UI portion 130 can be separated from the touch panel 120 in a pulling direction by using the cushion material 180. For example, the pulling portion 134 may be displaced in the pulling direction without using the cushion material by imparting elasticity to the pulling portion 134 itself of the three-dimensional UI portion 130. For example, the width of the cantilevered base portion of the pulling portion 134 may be narrowed or the thickness of the base portion may be thinned to facilitate elastic deformation, or the pulling portion 134 may be made of an elastic material.

Next, the pulling detection algorithm for detecting deformation of the finger will be described. FIG. 4C illustrates a state in which the finger U has touched the pulling portion 134, and the finger distance at this time is D. When the user hooks the finger U on the pulling portion 134 and lifts the finger U, the shape of the finger is crushed or deformed by the stress to be compressed in the pulling direction. As a result, the finger distance changes from D to D2 (D<D2). This change in the finger distance results in the change in the capacitance as much as can detect the pulling operation, and the touch panel 120 has sensitivity that can detect such a change in the capacitance.

Next, details of the controller 140 will be described. The controller 140 is electrically connected to the display 110 and the touch panel 120, and performs image control of the display 110 and touch control of the touch panel 120. The controller 140 performs overall processing of the input display device, for example, stores data such as a height, a shape, a position, and a video display area of the three-dimensional UI portion 130, performs a display area correction process, performs touch detection and operation determination (touch coordinates detection and detection of the magnitude of the finger distance/capacitance) from an output value of the touch panel 120, and performs a process of video display/video switching according to the touch detection and operation determination. The processing of the controller 140 is performed by hardware and/or software, and is performed by using, for example, a microcontroller including an arithmetic processing unit and a ROM/RAM.

As illustrated in FIG. 3, the controller 140 includes a touch detection unit 150, an operation determination unit 160, and a display control unit 170. The touch detection unit 150 drives the plurality of electrode lines on the X side and/or the Y side of the touch panel 120, measures the capacitance of each detection unit of the driven electrode line, and provides the measurement result to the operation determination unit 160.

The operation determination unit 160 detects a touch operation or a pulling operation on the touch panel 120 based on the measurement result of the touch detection unit 150. The touch mentioned here includes not only contact of the finger of the user with the touch panel 120, but also approach of the finger to the touch panel 120 at a predetermined distance. For example, when the finger of the user touches or approaches the flat surface of the touch panel 120, the operation determination unit 160 determines that the touch operation has been made based on the change in the capacitance of the corresponding detection unit. Similarly, when the finger of the user touches or approaches the three-dimensional UI portion 130, the capacitance of the detection unit corresponding to the three-dimensional UI portion 130 changes, and thus it is determined that the touch operation has been made on the three-dimensional UI portion 130 by the change in the capacitance.

Furthermore, when the touch operation on the three-dimensional UI portion 130 has been detected, and the capacitance at the touch position is changed within a predetermined time, the operation determination unit 160 determines whether or not there is the pulling operation from such a change. That is, as illustrated in FIGS. 4B and 4D, when the capacitance has changed in response to the change in the finger distance, if the change is equal to or greater than a certain threshold value, the operation determination unit 160 determines that the pulling operation on the three-dimensional UI portion 130 has been made. When the operation determination unit 160 determines that the touch operation or the pulling operation has been made, the controller 140 provides the input to another electronic device, or performs display control, or the like, corresponding to the input.

The display control unit 170 displays an image and a video on the display 110, and displays an icon at the corresponding position of the three-dimensional UI portion 130. The icon can be a design representing the input operation of the user. For example, an icon representing the operation of the power window is displayed below the three-dimensional UI portion 130. In addition, the display control unit 170 switches an image to be displayed on the display 120 to another image in response to the determination of the operation determination unit 160 that the touch operation or the pulling operation has been made.

Figure 5A:
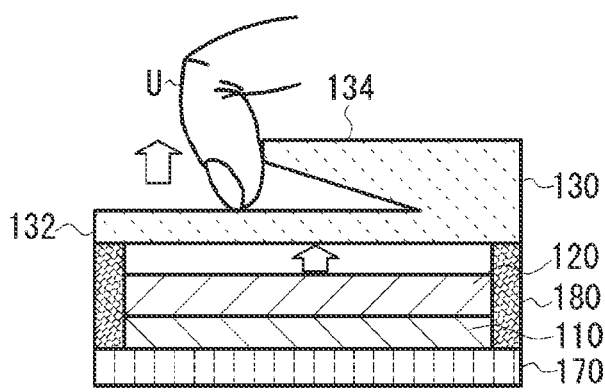
FIGS. 5A to 5D are schematic cross-sectional views for describing a pulling operation of the three-dimensional UI portion using the cushion material according to the example of the present disclosure.

Next, details of the three-dimensional UI portion 130 in the present example will be described. First, a method of detecting the finger distance of the three-dimensional UI portion 130 by using the cushion material will be described. In the structure illustrated in FIG. 5A, when the cushion material 180 is sandwiched between the product cover 170 and the bottom surface portion 132 of the three-dimensional UI portion 130, and the pulling portion 134 is pulled by the finger U, the cushion material 180 stretches in the vertical direction, whereby the bottom surface portion 132 is separated from the surface of the touch panel 120, the finger distance between the touch panel 120 and the finger U increases, and the capacitance detected by the touch panel 120 decreases. When the change in the capacitance is equal to or greater than the threshold value, this is determined as the pulling operation.

Figure 5B:
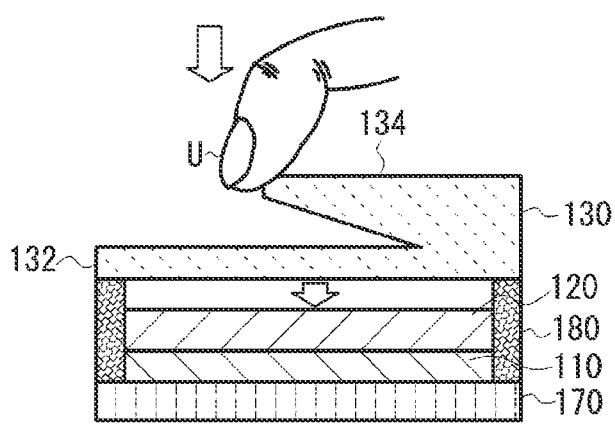

On the other hand, as illustrated in FIG. 5B, contrary to the pulling operation, when the end portion of the pulling portion 134 is pushed by the finger U, the cushion material 180 is compressed in the vertical direction, the bottom surface portion 132 becomes close to the surface of the touch panel 120, and the finger distance between the touch panel 120 and the finger U decreases. Thus, the capacitance detected by the touch panel 120 increases. When the change in the capacitance is equal to or greater than the threshold value, it is determined that this is a pressing pushing operation.

Furthermore, the cushion material 180 is attached at an appropriate position so that the visibility of the icon to be displayed does not decrease or the degree of freedom of the structure of the three-dimensional UI portion 130 does not decrease. In the three-dimensional UI portion 130 illustrated in FIG. 5A, the bottom surface portion 132 and the pulling portion 134 may be integrally molded, or both may be bonded with an adhesive, a double-sided tape, or the like. When the bottom surface portion 132 and the pulling portion 134 are integrally molded or bonded, it is desirable that the cushion material 180 be installed or attached to the outer peripheral portion of the sensor or the icon display of the touch panel 120.

Figure 5C:
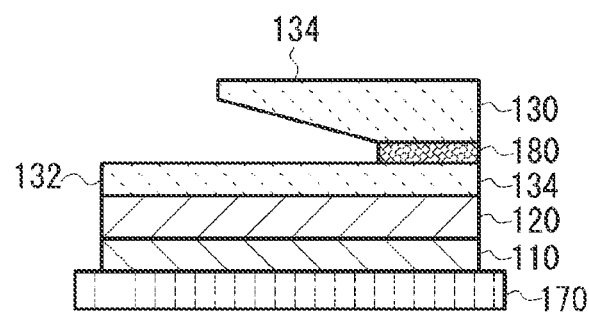

When the cushion material 180 is transparent or does not need to be transparent, as illustrated in FIG. 5C, the cushion material 180 may be sandwiched and bonded between the bottom surface portion 132 and the pulling portion 134. In this case, the pulling portion 134 changes in a pulling direction, or the pressing pushing direction via the cushion material 180, and the bottom surface portion 132 does not change.

Figure 5D:
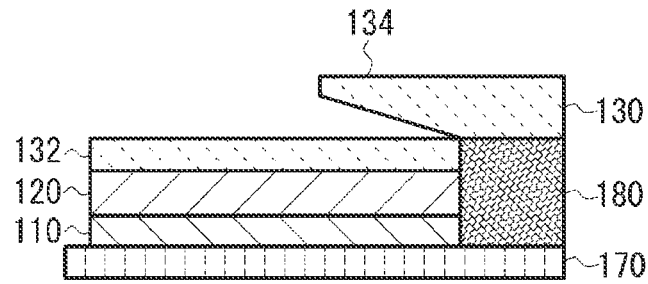

Furthermore, in a case of a configuration in which the bottom surface portion 132 of the three-dimensional UI portion 130 and the pulling portion 134 are not in direct contact with each other, or are not bonded to each other, as illustrated in FIG. 5D, the cushion material 180 is attached between the pulling portion 134 and the product cover 170 on the side portions of the bottom surface portion 132, the touch panel 120, and the display 110. Also in this case, the pulling portion 134 changes in a pulling direction, or the pressing pushing direction via the cushion material 180, and the bottom surface portion 132 does not change.

Figure 6A:
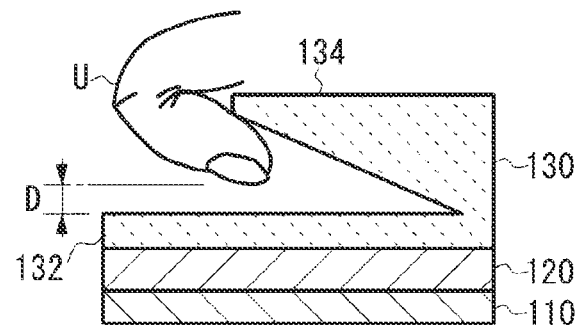
FIGS. 6A to 6D are schematic cross-sectional views for describing the pulling operation of the three-dimensional UI portion not using the cushion material according to the example of the present disclosure.
Figure 6B:
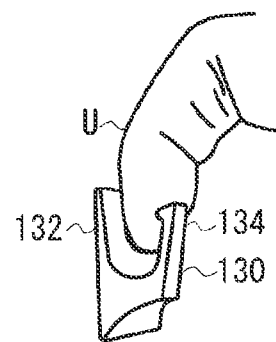
Figure 6C:
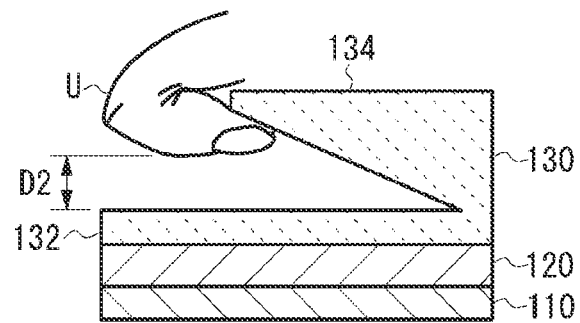
Figure 6D:
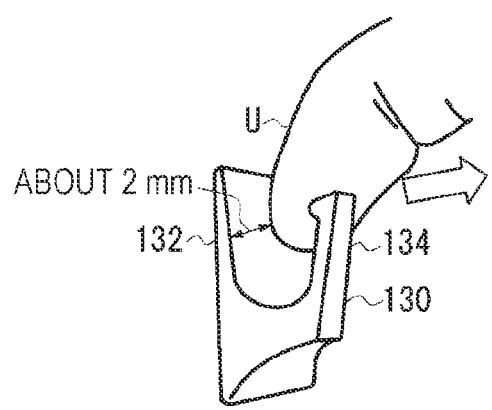

Next, a method of detecting the finger distance of the three-dimensional UI portion 130 by not using the cushion material will be described. In a case of a sensor having accuracy enabling detection of a small change in the finger distance (for example, about 2 mm), the pulling operation or the pressing operation can be detected, even with a structure not using the cushion material. FIGS. 6A and 6B illustrate a state when the finger U has touched the end portion of the pulling portion 134, and the finger distance from the sensor to the finger is D. FIGS. 6C and 6D illustrate a state of deformation (crushing) of the finger U when the finger U is pulled, even though the finger U is hooked on the end portion of the pulling portion 134. The finger U is deformed by about 2 mm, thereby the finger distance from the sensor to the finger U increases to D2 (D2>D).

Figure 7:
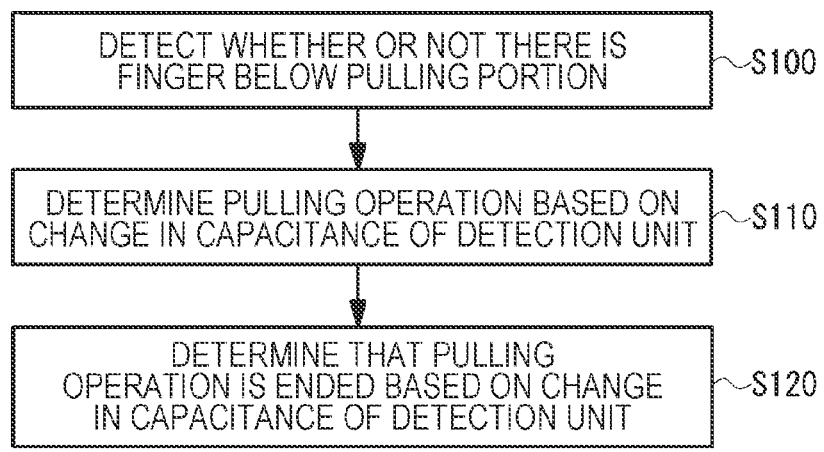
FIG. 7 is a view illustrating a flow for determining the pulling operation of the three-dimensional UI portion not using the cushion material according to the example of the present disclosure.
Figure 8:
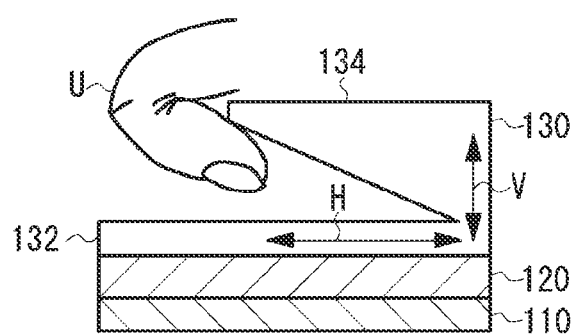
FIG. 8 is a schematic cross-sectional view for describing an operation in Step S100 in FIG. 7.

Next, FIG. 7 illustrates a flow of a determination operation of the operation determination unit 160 when the cushion material is not used. The operation determination unit 160 detects whether or not there is a finger below the pulling portion 134 based on the measurement result of the capacitance by the touch detection unit 150 (S100). As illustrated in FIG. 8, position coordinates (a portion of an arrow H) when the finger U is hooked on the pulling portion 134 and a threshold value (a portion of an arrow V) of the finger distance/capacitance when there is the finger U under the pulling portion 134 are registered in the operation determination unit 160 in advance. Although FIG. 8 illustrates only the coordinate range in one direction of the arrow H, the coordinate range by the arrow H may be specified as plane coordinates.

The operation determination unit 160 determines that there is the finger U below the pulling portion 134 when detecting a value that is within the position coordinates indicated by the arrow H and within the threshold value of the capacitance (within the finger distance) indicated by the arrow V based on the measurement result of the touch detection unit 150.

Figure 9A:
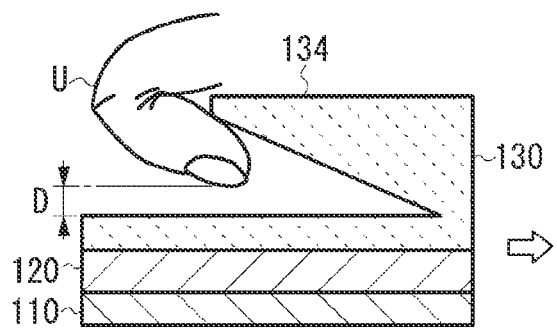
FIGS. 9A and 9B are schematic cross-sectional views for describing an operation of Step S110 in FIG. 7.
Figure 9B:
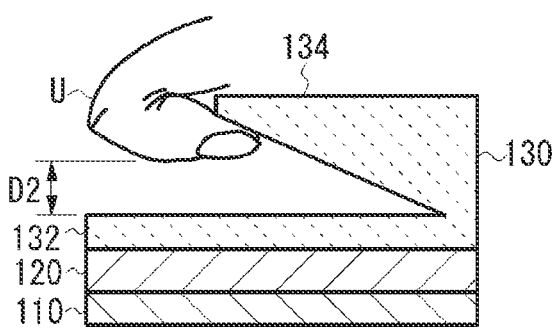

Then, the operation determination unit 160 determines a pulling operation based on the change in capacitance (S110). FIG. 9A illustrates a state before the pulling operation, and FIG. 9B illustrates a state during the pulling operation. As illustrated in FIG. 9B, the finger tip is compressed or crushed by performing the pulling operation, to change the angle of the finger, so that the finger distance changes from D in FIG. 9A to D2. As a result, the value of the capacitance detected by the sensor of the touch panel 120 decreases. The operation determination unit 160 determines the pulling operation by detecting the change in the capacitance.

Figure 10A:
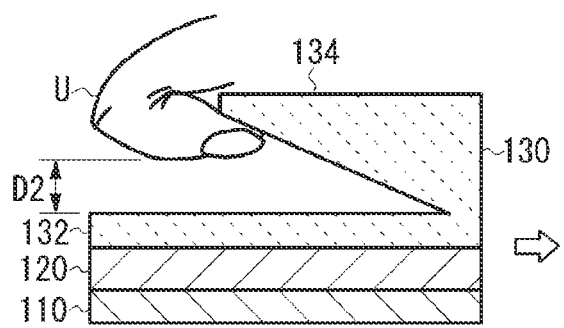
FIGS. 10A and 10B are schematic cross-sectional views for describing an operation of Step S120 in FIG. 7.
Figure 10B:
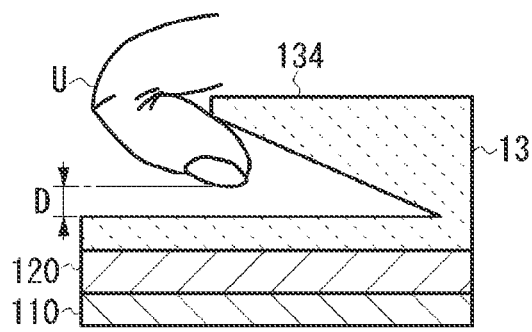

Then, when determining that the pulling operation has been performed, the operation determination unit 160 determines the end of the pulling operation based on the change in the capacitance (S120). FIG. 10A illustrates a state during the pulling operation, and FIG. 10B illustrates a state at the end of the pulling operation. As illustrated in FIG. 10B, in an operation to end the pulling operation, the finger is brought back to the original state as opposed to the pulling operation, so that the finger distance changes from D2 in FIG. 10A to D. As a result, the value of the capacitance detected by the sensor of the touch panel 120 increases. The operation determination unit 160 determines the end of the pulling operation by detecting the change in the capacitance.

Figure 11:
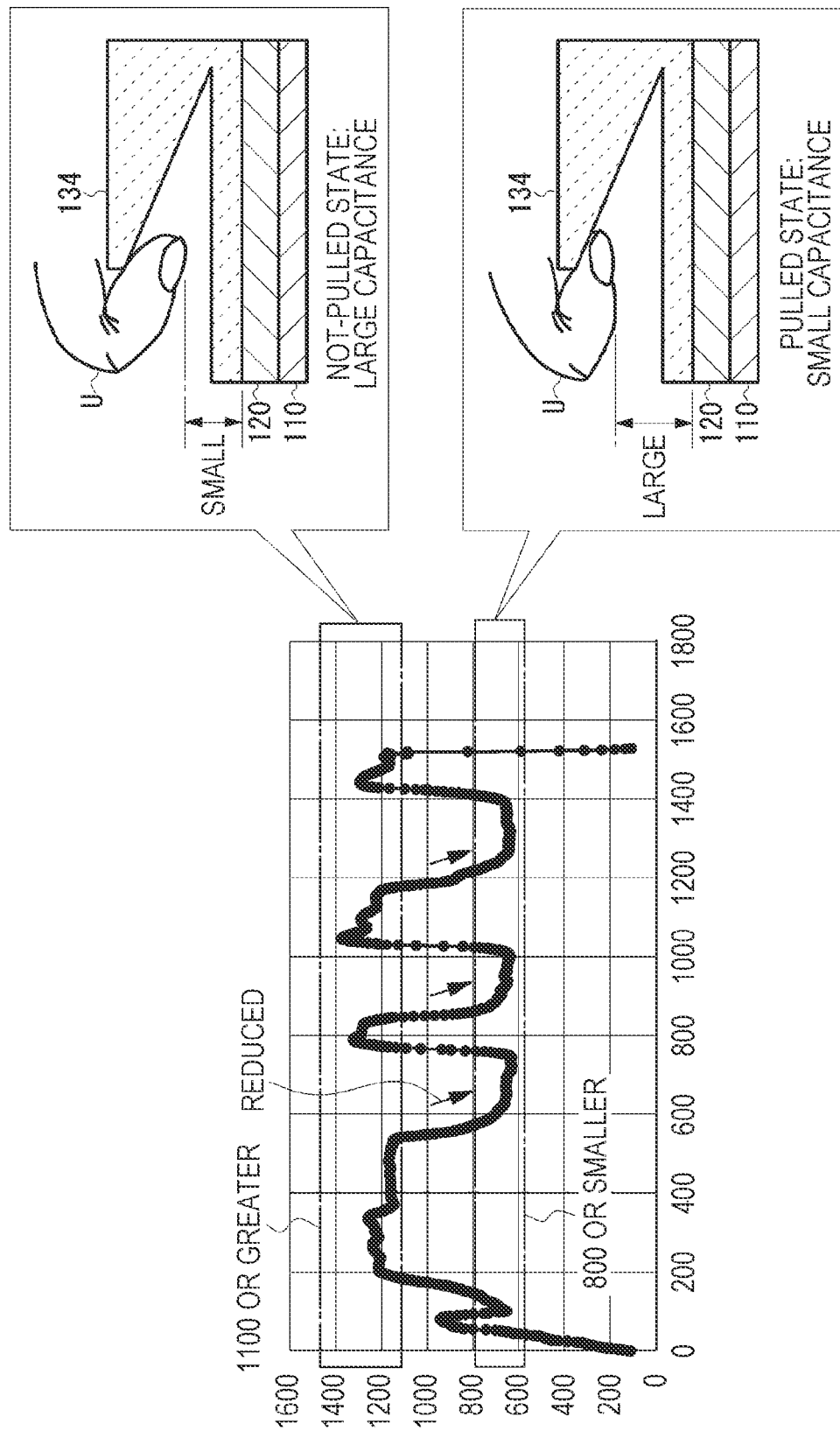
FIG. 11 is a graph for verifying a change in a capacitance when the pulling operation is performed on a three-dimensional UI portion in which the cushioning material is desired to be used.

Next, the graph of FIG. 11 shows the verification result of the change in the capacitance when the pulling operation to the three-dimensional UI portion, which does not use the cushion material, is performed. The vertical axis represents the value of the capacitance, and the horizontal axis represents the number of pieces of detected data. In this example, the capacitance is detected at 80 fps (frames/second).

As illustrated in the graph of FIG. 11, the value of the capacitance when the three-dimensional UI portion 130 is not pulled (when the finger distance is small) is about 1100 or greater, and the value of the capacitance when the three-dimensional UI portion 130 is pulled (when the finger distance is large) decreases to about 800 to 600. Therefore, by setting the threshold value for determining whether or not there is the pulling operation within a range of 800 to 1100 (for example, the threshold value may be set to 950), it is possible to accurately determine whether or not there is the pulling operation.

Figure 12:
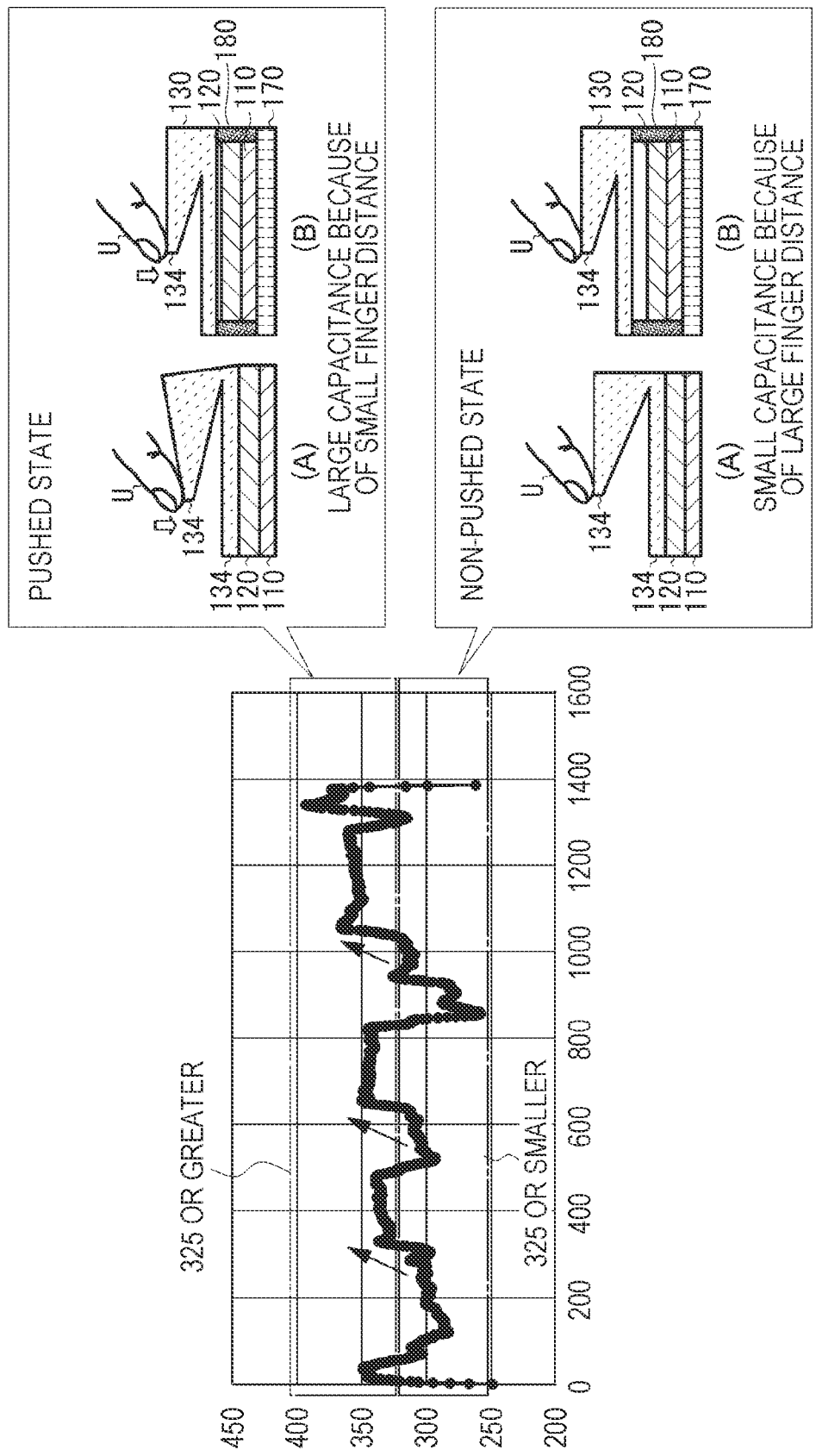
FIG. 12 is a graph for verifying a change in a capacitance when the three-dimensional UI portion is pressed.

In addition, the graph of FIG. 12 shows the verification result of the change in the capacitance when the three-dimensional UI portion is pressed. The vertical axis represents the value of the capacitance, and the horizontal axis represents the number of pieces of detected data. In this example, the capacitance is detected at 80 fps (frames/second).

Differing from the pulling operation, in the pressing operation, the finger distance does not change due to the crush of the finger. Thus, it is necessary to have a structure in which the finger distance is small at the time of pressing by a configuration (FIG. 12A) in which the pulling portion 134 itself of the three-dimensional UI portion 130 is made of a bending material, or a configuration (FIG. 12B) in which the cushion material 180 is sandwiched between the three-dimensional UI portion 130 and the product cover.

In the detection example here, a difference in detection value between the presence and absence of the pushing operation is not as large as that during the pulling operation, but the change in the capacitance during the pushing operation can be read from the graph. For example, it is possible to determine the pressed state or the non-pressed state by setting the threshold value when the value of the capacitance is 325 or greater or 325 or smaller.

As described above, according to the present example, in the product having the three-dimensional UI, it is possible to accurately detect the pulling operation with a simple structure without increasing the number of touch sensors. As a result, the three-dimensional UI can cope with an operation gesture of the pulling type switch.

The preferred embodiment of the present disclosure has been described in detail above. However, the present disclosure is not limited to the specific embodiment, and thus various modifications and alterations can be made in the scope of the gist of the invention in the claims.

What is claimed is:

1. An input display device comprising:
a display configured to display an image;
a capacitive touch panel configured to be attached onto the display and include at least one three-dimensional operation portion on a surface of the touch panel; and
a detection unit configured to detect an operation on the touch panel, wherein the three-dimensional operation portion includes a pulling portion imitating a shape of a pulling type switch, and the detection unit determines whether or not there is a pulling operation by detecting a change in a capacitance in response to a change in a distance to the touch panel from a finger touching the pulling portion;
wherein the operation portion is attached to the touch panel via an elastic member; and
wherein the detection unit determines whether or not there is a pulling operation by detecting a change in a capacitance due to a change in a shape of a finger touching the pulling portion.

2. The input display device according to claim 1, wherein the elastic member is provided between a bottom surface of the operation portion and a fixing portion that supports the display.

3. The input display device according to claim 1, wherein the operation portion includes the pulling portion and a bottom surface portion disposed below the pulling portion, and the elastic member is provided between the pulling portion and the bottom surface portion.

4. The input display device according to claim 1, wherein the operation portion includes the pulling portion and a bottom surface portion disposed below the pulling portion, and the elastic member is provided between the pulling portion and a fixing portion that supports the display.

5. The input display device according to claim 1, wherein the pulling portion is configured by a member that is elastically deformable in a pulling direction.

6. The input display device according to claim 1, wherein the detection unit determines that a pulling operation has been performed when a decrease in capacitance of the pulling portion is equal to or greater than a threshold value.

7. The input display device according to claim 1, wherein the detection unit determines that a pressing operation has been performed when an increase in capacitance of the pulling portion is equal to or greater than a threshold value.

8. The input display device according to claim 1, further comprising: a display unit configured to display an icon representing an input operation at a position corresponding to the operation portion of the display.

* * * * *